United States Patent
Mendoza et al.

(10) Patent No.: US 8,118,350 B2
(45) Date of Patent: Feb. 21, 2012

(54) VEHICLE BODY WITH A FLOOR-SIDE REINFORCEMENT

(75) Inventors: Boris Suaznabar Mendoza, Bietigheim (DE); Ursula Schäf, Markgroeningen (DE); Heiko Teichmann, Weil im Schönbuch (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 296 days.

(21) Appl. No.: 12/463,447

(22) Filed: May 11, 2009

(65) Prior Publication Data

US 2010/0026052 A1 Feb. 4, 2010

(30) Foreign Application Priority Data

Aug. 4, 2008 (DE) .................. 10 2008 036 338

(51) Int. Cl.
*B62D 25/20* (2006.01)

(52) U.S. Cl. .............. 296/193.07; 296/204; 296/187.12
(58) Field of Classification Search .................. 296/204, 296/193.07, 187.12, 203.01, 203.03, 65.01
See application file for complete search history.

(56) References Cited

U.S. PATENT DOCUMENTS

| | | | | |
|---|---|---|---|---|
| 4,081,197 A | * | 3/1978 | Ackel | ........................... 296/204 |
| 4,563,035 A | * | 1/1986 | Hirakami et al. | ........ 296/203.04 |
| 4,892,350 A | | 1/1990 | Kijima | |
| 6,145,923 A | | 11/2000 | Masuda | |
| 6,209,914 B1 | | 4/2001 | Grieser et al. | |

FOREIGN PATENT DOCUMENTS

| | | |
|---|---|---|
| DE | 19821107 A1 | 11/1999 |
| DE | 10 2005 016 994 A1 | 10/2006 |
| DE | 102005025223 A1 | 12/2006 |

OTHER PUBLICATIONS

Chinese Office Action dated Oct. 27, 2010.
German Search Report dated Apr. 22, 2009.

* cited by examiner

*Primary Examiner* — Dennis Pedder

(57) ABSTRACT

A vehicle body has a floor-side reinforcement, in particular crash reinforcement structure, laterally on both sides of the central tunnel, for a transmission support. The transmission support is arranged between reinforcement elements of the vehicle floor which are held so as to be situated opposite on the vehicle floor interior and on the vehicle floor exterior respectively. Outer lateral longitudinal edges of the reinforcement elements are connected to floor longitudinal beams and inner lateral longitudinal edges are connected to transmission longitudinal beams which are held so as to be supported at the central tunnel.

4 Claims, 3 Drawing Sheets

VEHICLE BODY WITH A FLOOR-SIDE REINFORCEMENT

CROSS-REFERENCE TO RELATED APPLICATION

This application claims the priority, under 35 U.S.C. §119, of German application DE 10 2008 036 338.3, filed Aug. 4, 2008; the prior application is herewith incorporated by reference in its entirety.

BACKGROUND OF THE INVENTION

Field of the Invention

The invention lies in the automotive field. More specifically, the invention relates to a vehicle body having a floor-side reinforcement for a transmission support which is arranged below a central tunnel so as to bridge the latter transversely, and which, via at least one mount, holds a transmission of a drive unit.

German published patent application DE 10 2005 016 994 A1 describes a reinforcement element for a vehicle floor of a motor vehicle for preventing torsion. The reinforcement element is of planar design and is arranged on a side of the body that faces away from the passenger compartment.

SUMMARY OF THE INVENTION

It is an object of the invention to provide a vehicle body with a floor-side reinforcement which overcomes the disadvantages of the heretofore-known devices and methods of this general type and which provides for a transmission support and which reinforcement is designed in particular as a crash reinforcement structure in the event of side impact forces.

With the foregoing and other objects in view there is provided, in accordance with the invention, a vehicle body with a vehicle floor and a central tunnel, a floor-side reinforcement, comprising:

lateral reinforcement elements of the vehicle floor disposed opposite one another on a vehicle floor inner side and a vehicle floor outer side, respectively;

a floor longitudinal beam extending along the vehicle floor and a transmission longitudinal beam held at the central tunnel;

a transmission support disposed below the central tunnel and between the lateral reinforcement elements of the vehicle floor, the transmission support bridging the central tunnel in a transverse direction, and holding, via at least one mount, a transmission of a drive unit of the vehicle;

the reinforcement elements forming a floor-side reinforcement for the transmission support, the reinforcement elements having outer lateral longitudinal edges connected in each case to the floor longitudinal beam, and inner lateral longitudinal edges connected to the transmission longitudinal beam.

The main advantages obtained by way of the invention are that reinforcement elements are arranged on the vehicle floor to both sides of a transmission support which is arranged below a central tunnel. The reinforcement elements are capable of stiffening the vehicle floor in the transverse direction. According to one refinement of the invention, it is provided for this purpose that the transmission support is arranged between reinforcement elements of the vehicle floor which are held so as to be situated opposite on the vehicle floor inner side and vehicle floor outer side, and outer lateral longitudinal edges of the reinforcement elements are connected to floor longitudinal beams and inner lateral longitudinal edges are connected to transmission longitudinal beams which are held so as to be supported on the central tunnel. In particular, the reinforcement elements are composed of floor panels which have a greater longitudinal extent than the transmission support and which are provided with reinforcement seams. As a result of said arrangement of the floor panels between the floor longitudinal beams and transmission longitudinal beams to each side of the central tunnel, a continuous floor region to which the transmission support is fastened is reinforced, such that crash reinforcement can be obtained in particular in the event of a side impact.

Furthermore, it is provided according to the invention that in each case the inner longitudinal edge of the outer floor panel as viewed in relation to the vehicle floor is connected to the floor longitudinal beam and to the transmission longitudinal beam by means of fastening elements, and that the outer longitudinal edge of the floor panel is connected in each case to the floor longitudinal beam and/or to the vehicle floor. As a result of said connection of the floor panels to the longitudinal beams, a stable region is formed on each side of the central tunnel between the longitudinal beams of each side, and the transmission support is protected against displacement, or other changes in position, in the event of a crash. The fastening elements are fixedly connected to the floor panel, in particular for assembly reasons, and screw means can be inserted into said fastening elements from the underside of the vehicle floor.

It is also provided according to the invention that an inner longitudinal edge of the inner floor panel as viewed in relation to the vehicle floor is connected to a side wall of the central tunnel and an outer longitudinal edge is connected to the floor longitudinal beam. The vehicle floor is therefore arranged between the two floor panels and is connected at one side to a horizontal bent portion of the central tunnel and at the other side to the floor longitudinal beam. The floor panels are arranged so as to be partially spaced apart from the vehicle floor, so as to provide, in effect, a stable hollow profile.

In particular, the floor longitudinal beam is composed of three beam profiles which are assembled to form a closed profile, and longitudinal edges of the floor panels are connected to the closed profile, such that the vehicle floor is held between the beam profiles.

The two floor panels form a crash reinforcement structure, in such a way that side forces can be conducted in the transverse direction of floor longitudinal beams via the floor panels to the transmission longitudinal beams.

Other features which are considered as characteristic for the invention are set forth in the appended claims.

Although the invention is illustrated and described herein as embodied in a vehicle body with a floor-side reinforcement, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
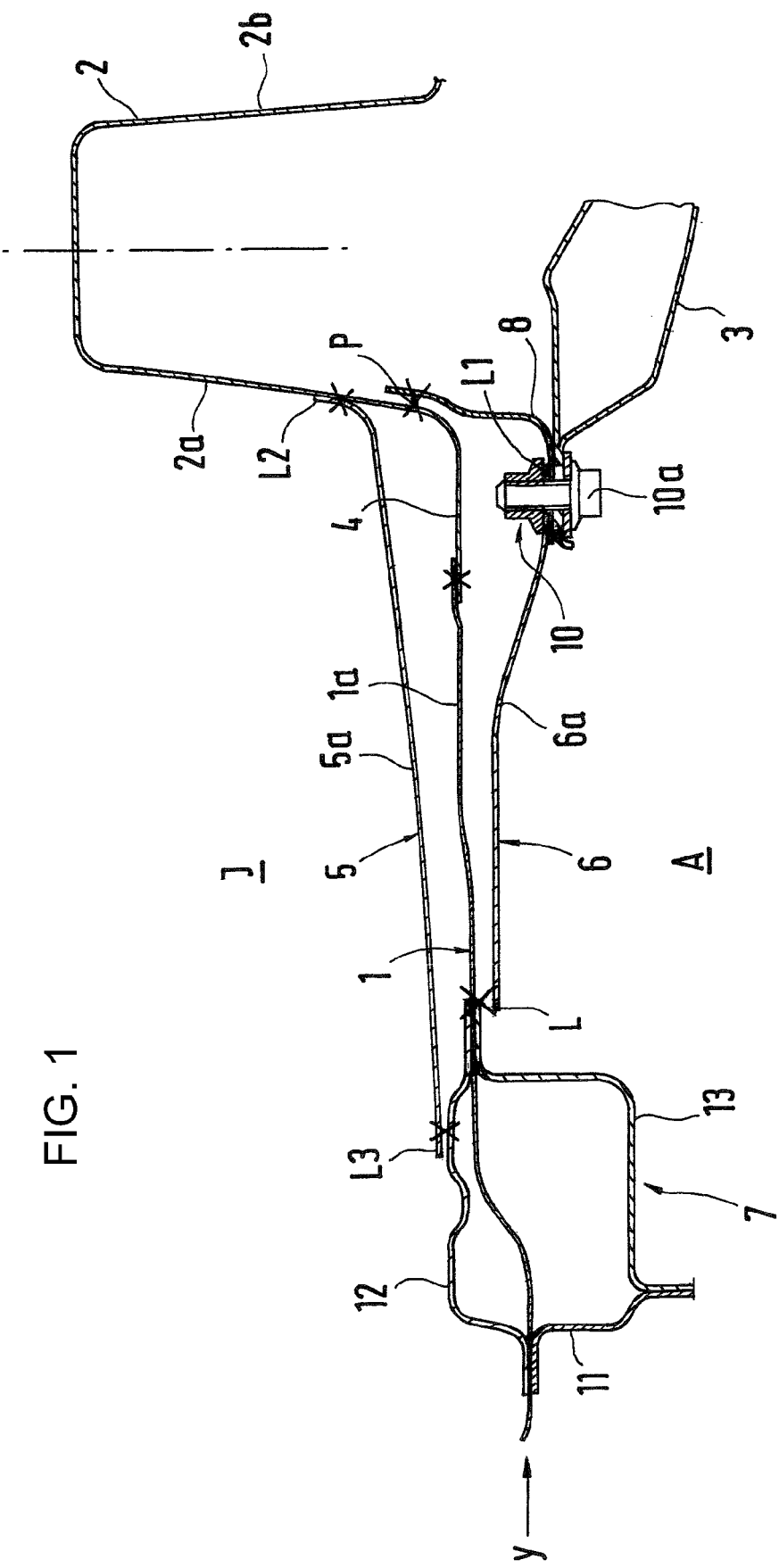
FIG. 1 is a section taken along the line I-I in FIG. 2 through a transmission support with floor-side reinforcements.
Figure 2:
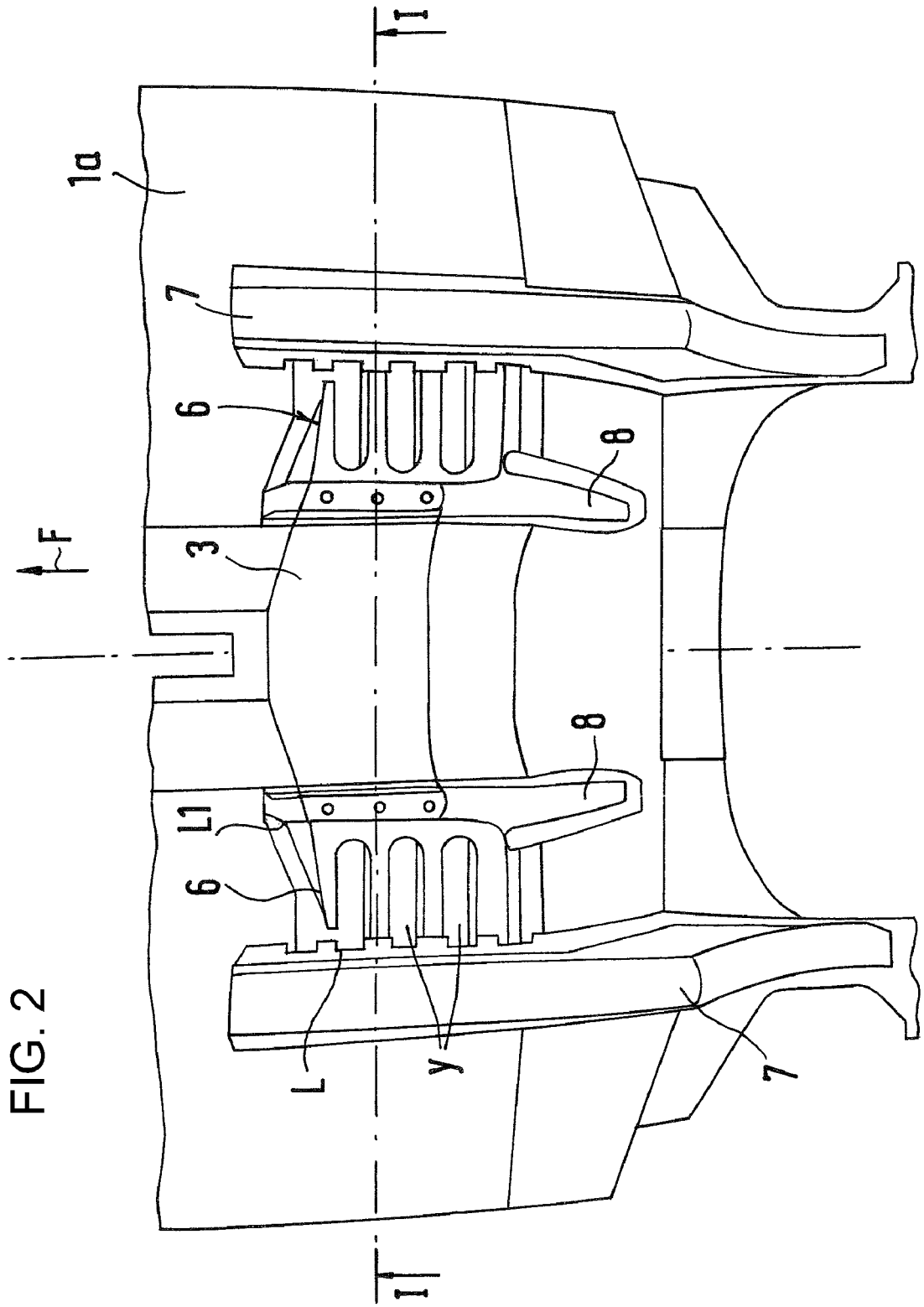
FIG. 2 is a view from below of the vehicle floor with outer reinforcement, the transmission support and floor longitudinal beams.
Figure 3:
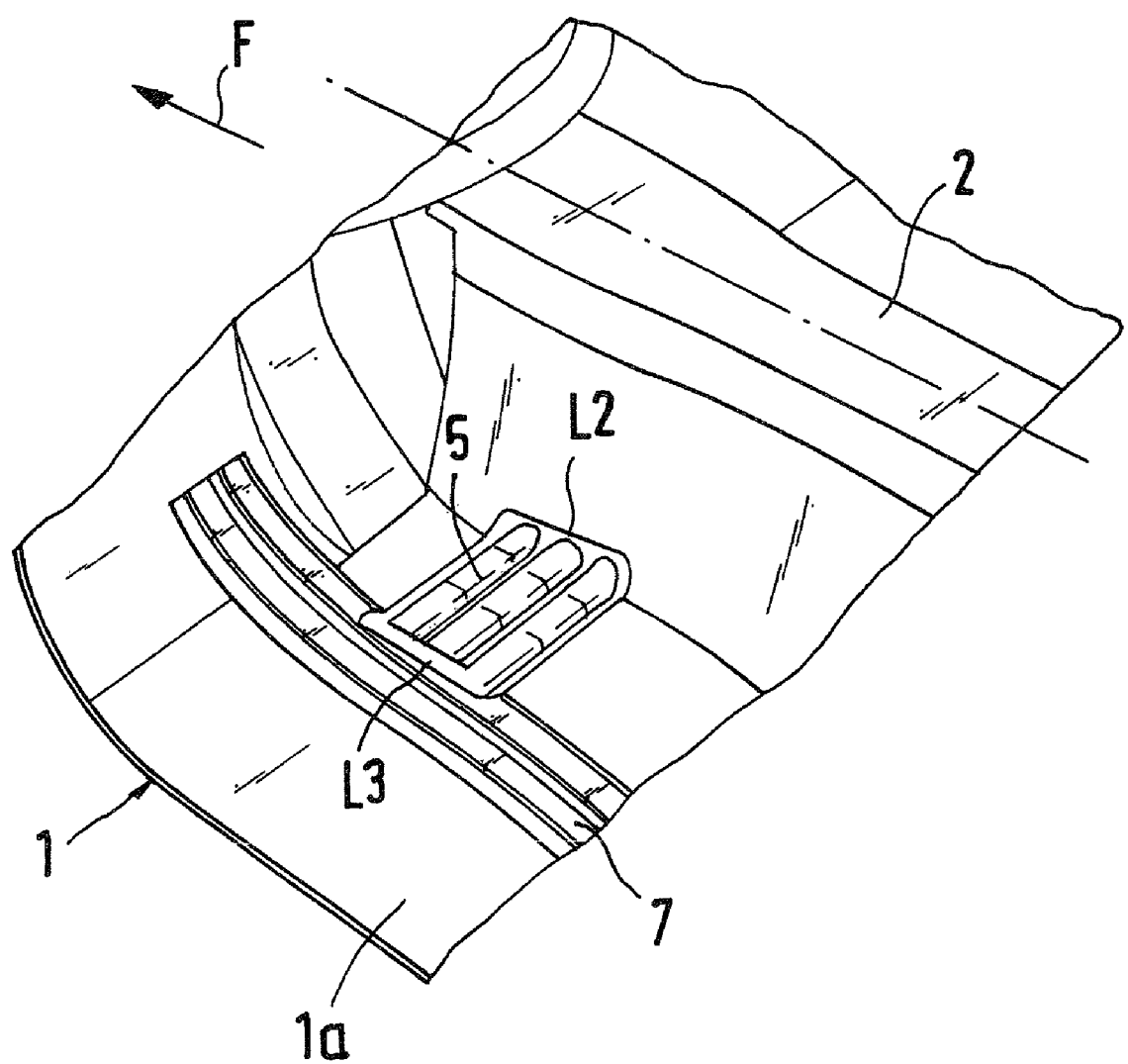
FIG. 3 shows a diagrammatic illustration of an inner reinforcement element with floor longitudinal beams.

Referring now to the figures of the drawing in detail and first, particularly, to FIG. 1 thereof, a vehicle body for a motor vehicle comprises, substantially in the region of a vehicle floor 1, a central tunnel 2 of U-shaped cross section. The central tunnel 2 extends in the vehicle longitudinal direction and comprises two side walls 2a and 2b. At the underside, the central tunnel 2 has a transmission support 3, or transmission carrier 3, for mounting a transmission of a drive unit, for example via a mount. In each case one floor plate 1a of the floor panel 1 is connected to horizontal bent portions 4 of the central tunnel 2. The vehicle floor 1 has, on each side in each case at a transverse distance from the central tunnel 2, longitudinally running floor longitudinal beams 7. Reinforcement elements 5, 6 are disposed between the beams 7 and the central tunnel 2.

The one reinforcement element 5 is arranged within the vehicle body on the vehicle inner side I, i.e., the interior side, and the further reinforcement element 6 is arranged outside on the vehicle outer side A, i.e., the exterior side. The two reinforcement elements 5, 6 are situated opposite one another, that is to say partially with a spacing to one another, and hold between them a floor plate 1a of the vehicle floor 1.

The reinforcement elements 5, 6 composed of separate floor panels 5a, 6a, for example with seams or other reinforcements, are arranged at both sides of the central tunnel 2 in such a way as to hold the transmission support 3 between them.

The outer floor panel 6a is connected with an outer longitudinal edge L to the floor longitudinal beam 7 and with an inner longitudinal edge L1 to the transmission longitudinal beam 8. The latter extends in the vehicle longitudinal direction parallel to the central tunnel 2, and is connected to a side wall 2a or 2b at points P.

The transmission support 3 has fastening elements 10 or screw nuts which are fixedly connected to the floor panel 6a, for example by means of a welded connection. The transmission support 3 is held on the floor panel 6a and on the transmission longitudinal beam 8 by screw means 10a.

The inner floor panel 5a is fastened with an inner longitudinal edge L2 in each case to a side wall 2a and 2b of the central tunnel 2, and an outer longitudinal edge L3 is connected to the floor longitudinal beam 7.

The floor longitudinal beam 7 is composed of three beam profiles 11, 12, 13 which are assembled to form a closed profile. The floor plate 1a runs outward in relation to the vehicle between said beam profiles. The floor plate 1a is supported between bent limbs of the beam profiles 11 to 13.

Due to the arrangement of the floor panels 5a, 6a, which are arranged one above the other, between the central tunnel 2 and the transmission longitudinal beams 8 and the floor longitudinal beams 7 on each side of the central tunnel, a stable reinforcement is obtained in that region. The reinforcement ensures optimum crash reinforcement in particular in the event of a side impact in the lateral y direction.

The invention claimed is:

1. A vehicle body, comprising:
   a central tunnel having a side wall;
   a floor longitudinal beam composed of three beam profiles assembled to form a closed profile and having bent limbs;
   a vehicle floor having a floor plate;
   a transmission support;
   a floor-side reinforcement for said transmission support and having two lateral reinforcement elements, said lateral reinforcement elements disposed on both sides of said central tunnel and having longitudinal edges connected with said central tunnel and said floor longitudinal beam, said transmission support disposed between said lateral reinforcement elements;
   said transmission support disposed below said central tunnel so as to bridge said central tunnel transversely and holds a transmission of a drive unit;
   said floor plate of said vehicle floor disposed between said two lateral reinforcement elements and said floor plate extending through said floor longitudinal beam;
   said lateral reinforcement elements lie one atop the other, said lateral reinforcement elements being disposed on a vehicle floor inner side and a vehicle floor outer side so as to be opposite one another and having a longitudinal extension projecting beyond a length of said transmission support and further having transversely running reinforcement seams;
   said floor plate being held between opposite ones of said bent limbs of said beam profiles;
   a transmission longitudinal beam;
   fastening elements;
   said bent limbs of said floor longitudinal beam include a horizontal, bent portion; and
   said two lateral reinforcement elements defining an outer floor panel as seen in relation to said vehicle floor and an inner floor panel, said outer floor panel having an outer longitudinal edge fastened on a bottom side to said horizontal, bent portion of said floor longitudinal beam, said outer floor panel having an inner longitudinal edge coupled to said transmission longitudinal beam via said fastening elements, said inner floor panel having an outer lateral longitudinal edge fastened above said floor longitudinal beam at one of said beam profiles and an inner lateral longitudinal edge fastened on an outside to said side wall of said central tunnel.

2. The vehicle body according to claim 1, wherein said fastening elements are fixedly connected to said outer floor panel, and said fasting elements include screw means, which can be connected thereto, can be inserted from an underside of said vehicle floor.

3. The vehicle body according to claim 1, wherein said inner longitudinal edge of said inner floor panel as seen in relation to said vehicle floor can be connected with said side wall of said central tunnel via an angled bent portion forming said inner longitudinal edge and that said side wall has a horizontally running bent portion below a connection of said inner longitudinal edge with said side wall, on which said floor plate is connected.

4. The vehicle body according to claim 1, wherein said inner and outer floor panels form a crash reinforcement structure in such a way that side forces can be conducted from said floor longitudinal beam via said inner and outer floor panels to said transmission longitudinal beam.

* * * * *